June 18, 1968  J. S. STAHL  3,389,196
METHOD OF MAKING AN INSULATED CORE BUILDING PANEL
Filed July 24, 1964  2 Sheets-Sheet 1
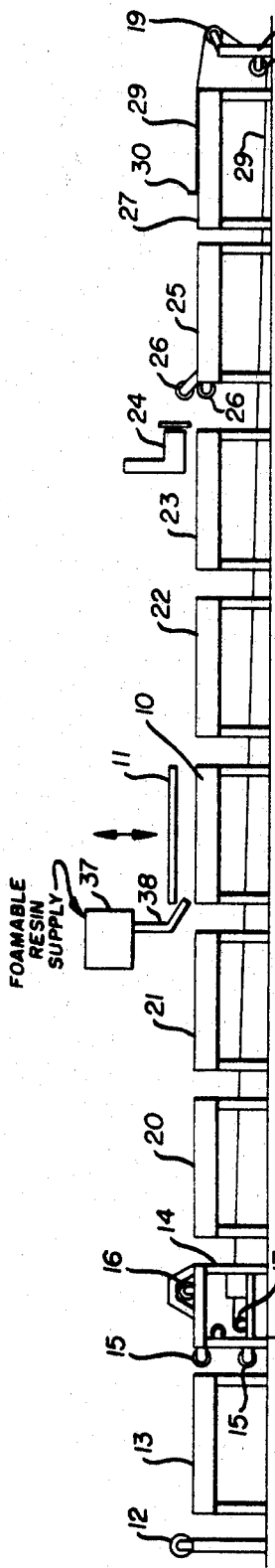
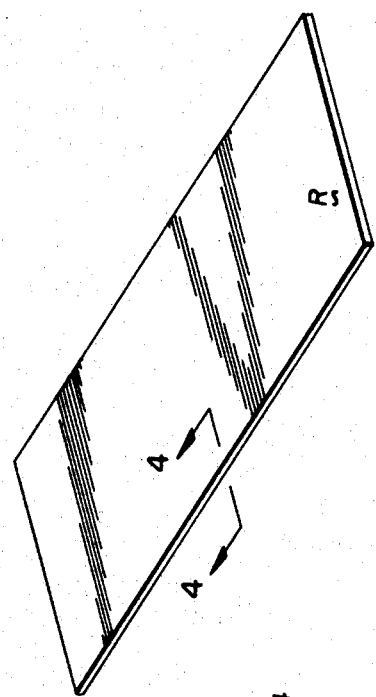
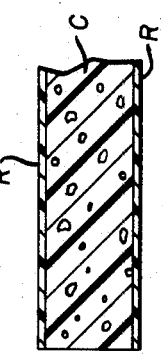
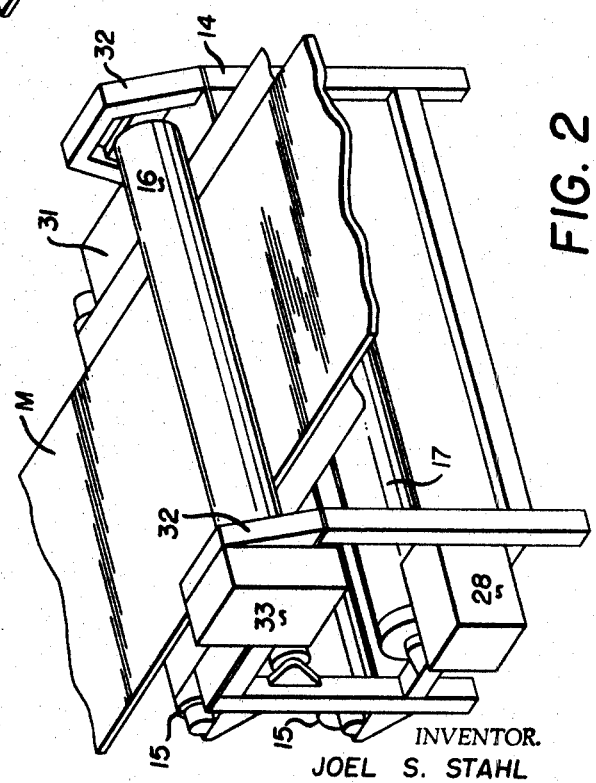
INVENTOR.
JOEL S. STAHL
BY
W. B. Harpman
ATTORNEY June 18, 1968   J. S. STAHL   3,389,196
METHOD OF MAKING AN INSULATED CORE BUILDING PANEL
Filed July 24, 1964   2 Sheets-Sheet 2

INVENTOR.
JOEL S. STAHL
BY
*W. B. Harpman*
ATTORNEY

3,389,196
METHOD OF MAKING AN INSULATED CORE BUILDING PANEL
Joel S. Stahl, Youngstown, Ohio, assignor to Stahl Industries, Inc., Youngstown, Ohio, a corporation of Ohio
Filed July 24, 1964, Ser. No. 384,832
1 Claim. (Cl. 264—45)

ABSTRACT OF THE DISCLOSURE

A method of making an insulated core building panel having surface sheets of a resin such as a polyester or acrylic with a core of foamed resin, such as polyurethane wherein the core material and the surface sheet are cured simultaneously. A cellophane sheet is used as a carrier sheet for the surface sheets while they are prepared and as a liner for a forming press wherein the surface sheets and the core of foam material are cured simultaneously. The liner can be a part of the final product or removed from the final product.

---

This invention relates to the manufacture of a building panel and more particularly to an insulated core building panel in which surface sheets are of a suitable resin, such as polyester and/or acrylic and wherein the core of foamed resin, such as polyurethane, is cured simultaneously with the surface panels so as to have an integral bond therewith.

The principal object of the invention is the provision of an improved method of making an insulated core building panel.

A further object of the invention is the provision of a method of making an insulated core building panel in which the surface sheets of the panel are formed and cured simultaneously with the core material therebetween.

A still further object of the invention is the provision of a method of making an insulated core building panel on a continuous production line at low cost and with low-cost production line equipment.

A still further object of the invention is the provision of a method of making an insulated core building panel that may incorporate fiberglass reinforcing in the surface panels thereof and which has unusual weathering characteristics contributing to the long life thereof.

A still further object of the invention is the provision of a method of making an insulated core building panel which may be carried on as a continuous production method, or, alternately, by an assembly of partially cured preformed parts arranged to form an integral insulated core panel.

A still further object of the invention is the provision of a method of producing an insulated core resin surfaced building panel which is inexpensive to construct and which may be formed of low-cost readily available material.

The insulated core resin surfaced panel comprising the article produced by the method herein disclosed differs from sandwich panels heretofore known in uncured temporary supported art in that the surface panels and the insulating core are formed and cured simultaneously so as to form a fixed dimension, integrally bonded unit. Similar panels heretofore known in the art have comprised surface panels of metal, plywood, or cured resin, with an insulated core structure assembled therebetween, together with an adhesive in an attempt to form an integral unit. Such panels require individual processing of the components to completion prior to assembly with the result that the sandwich panel formed therefrom may or may not have a suitable bond between the insulating core and the panels defining the surfaces thereof.

The present invention proposes to support and form the reinforced resin surface panels against suitable molds which are spaced, and the space provided with a limiting edge means, whereupon the foaming material is injected between the partially formed and uncured resin panels and the necessary curing steps then taken to form an integral insulated core solid resin surfaced building panel in situ.

The method herein disclosed is capable of variation with respect to the shape and size of the panel formed, the material from which it is formed, the color of the material and the surface texture of the panel. Furthermore, the insulated core material may be varied so as to render the same fireproof, for example, by incorporating inorganic material with the organic plastic foams ordinarily used, for example, fine sand may be introduced into polyurethane, or lightweight portland cement may be mixed with the polyurethane which is then foamed in the usual manner and subsequently cured. The core material may include stiffeners. Solid fillers such as hardboard, flakeboard and the like may also be used between the partially formed and uncured resin panels along with a foam core if an insulated solid core building panel of integral construction is desired.

With the foregoing and other objects in view which will appear as the description proceeds, the invention resides in the method hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a symbolic diagram of a production line for forming the insulated core building panels by the method disclosed herein.

FIGURE 2 is a perspective view on an enlarged scale of an impregnator stand comprising one of the elements symbolically illustrated in the production line of FIGURE 1.

FIGURE 3 is a perspective view of one of the insulated core resin surfaced building panels formed in accordance with the invention.

FIGURE 4 is an enlarged cross section with parts broken away and on line 4—4 of FIGURE 3.

Figure 5:
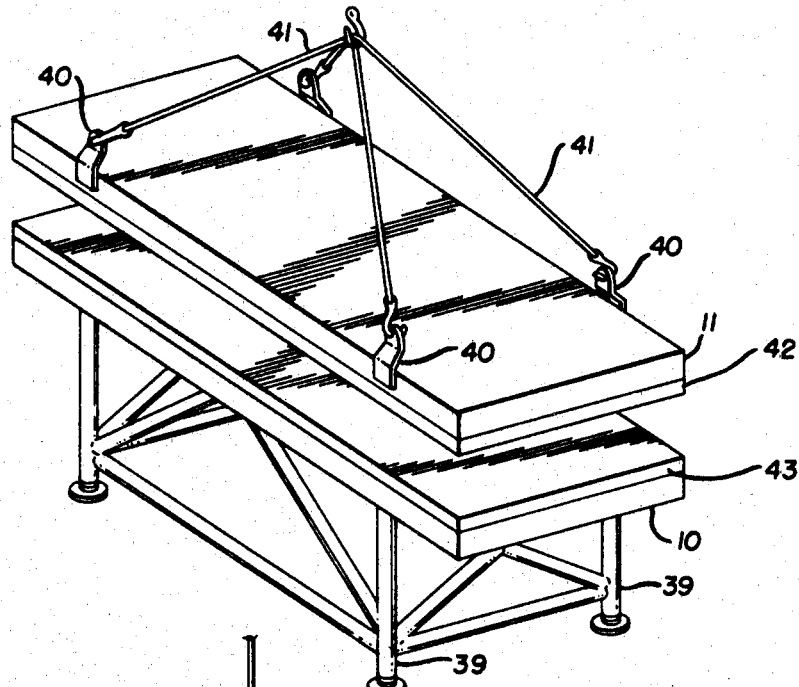
FIGURE 5 is a perspective view of a forming press comprising one of the elements in the production line shown symbolically in FIGURE 1.

By referring to FIGURE 1 of the drawings, a symbolic production line may be seen by which the insulated core resin surfaced building panels may be integrally formed in accordance with the method of the invention.

In FIGURE 1 of the drawings, a forming press is located midway in the production line and includes a stand 10 and a top head 11 which is movable vertically relative thereto and provided with means for exerting suitable pressure. The stand 10 and top head 11 receive porcelain enameled steel molds forming flat horizontal surfaces between which the reinforced resin surface panels are positioned together with the core material.

As will be understood in the art, the molds are provided with heating means preferably electric so that suitable temperatures may be generated therein.

To the left of the forming press and at the extreme left of FIGURE 1, there is a fiberglass mat let-off stand 12 and a mat cutting table 13 adjacent thereto.

The next unit to the right of the mat cutting table 13 comprises an impregnator stand 14 which includes means for supplying a supporting resin film 9, such as cellophane or the like. The means for supplying the supporting film comprise rolls 15, 15, and the impregnator stand includes a squeeze roll 16 under which the impregnated fiberglass mat is pulled by a winch 17 which is located in the impregnator stand and the cable of which extends longitudinally beneath the production line to an end support 18 where it is trained over pulleys and then extends backwardly across the top of the production line stands so that it may be used to pull the resin impregnated fiberglass mat therealong, as will be more fully explained later.

The resin used to impregnate the fiberglass mat as it passes across the impregnator stand 14 preferably comprises an acrylic syrup which is cross linked chemically and is thermal setting, as will be understood by those skilled in the art. The acrylic syrup is flowed on and worked into the mat until the quantity thereof is sufficient to form the lower solid resin surface which is supported on the cellophane film 9. The impregnated fiberglass mat is then moved to the right, as seen in FIGURE 1 of the drawings, to a flat run-out table 20 adjacent thereto which is provided with heating means for a first preheating stage, whereupon the acrylic syrup, or other resin employed, is heated only sufficiently to set the same into a soft gel-like condition which enables it to be efficiently handled. Thereupon, the impregnated fiberglass mat is moved to the next step to the right, as seen in FIGURE 1, which comprises a preformed table 21 which is also provided with heating means and from this preformed table 21 the sized fiberglass resin impregnated mat is moved to the forming press 10 and positioned on a lower mold surface therein.

At this stage of the formation of the insulated core resin surface building panel, a second fiberglass mat is played off the mat and supporting cellophane film section reinforcement let-off 12 to the cutting table 13, subjected to impregnation with the suitable resin in the impregnating stand 14 and moved across the run-out table 20 and the preformed table 21 and then completely inverted and positioned in superimposed relation in the forming press 10 beneath the top head 11 thereof where it is held by vacuum.

In order that the foaming material may be contained between the impregnated fiberglass mats thus positioned in the forming press when the same is inserted therein, an aluminum frame comprising a marginal spacer element is positioned in the forming press and foamable resin composition is introduced into the cavity defined by the two impregnated fiberglass mats and the marginal spacer element, the forming press being positioned to allow the foamable resin composition to expand to the definitional limits of the cavity and to merge with and adhere to the still uncured slightly set resin impregnated fiberglass mats which form the skins or surfaces of the panel while the resin composition expands in place. The forming press then is actuated to apply heat and pressure, as will be understood by those skilled in the art, to control the definitional limits of the core area of the building panel being formed, and the impregnated fiberglass mats and the foamable resin composition are simultaneously cured whereby a desirable building panel having thin, integrally formed solid resin surfaces and an insulated foamed core results.

Those skilled in the art will thus observe that the first stage in the method of producing the insulated core resin surface building panels disclosed herein comprises the fiberglass mat reinforcement let off, cutting the mat, impregnating the same, conveying it to the run-out and preformed table where it is preheated sufficiently to impart slight set to the acrylic syrup which is used; this step is repeated and that the second stage of the method comprises the hereinbefore described assembly of the two impregnated fiberglass mat surface portions in superimposed oppositely disposed relation in the forming press, and the introduction of the marginal spacer elements which are essential, and the subsequent introduction of the foamable resin composition in the cavity thus defined.

Those skilled in the art will observe that foamable resin composition may comprise polyurethane or other resins and that they may be loaded with inorganic materials as hereinbefore noted.

The third stage of the method herein disclosed comprises the opening of the forming press 10 following the essential curing of the insulated core resin surface panel, and it will be observed that the method hereindisclosed has related to the formation of such panels from irreversible thermal setting materials. In the third stage, the cured panel is moved to the cooling table 22 to moderate the reaction in the panel and subsequently to a post-cure table 23 which is preferably provided with a cut-off saw 24 so that the panel may be edge trimmed and/or cut to appropriate desired length, as will be understood by those skilled in the art. The cooling table, the post-cure table and the adjacent secondary post-cure table 25 are heated so that the complete cure of the panel may be controlled thereby. The secondary post-cure table includes a pair of superimposed rolls 26, 26 through which the panel is passed, and it then moves to a final flat run-out table 27 from whence the finished panel may be removed.

By referring now to FIGURE 2 of the drawings, a detailed view of the impregnator stand 14 heretofore referred to may be seen, and it will be observed that there is a source of rotary motion 28 indicated, which is arranged to drive the winch roll 17 which energizes the winch cable 29 as seen in FIGURE 1 of the drawings which extends therebeneath and then across the top thereof and is provided with appropriately shaped end portion 30 for engaging and moving the panel through the several stages of formation, and particularly those stages following its assembly and cure in the forming press 10.

The cellophane film 9, which is supplied from a supply roll 15 on the impregnator stand 14 and is fed up and over an idler roll 15 thereabove and then moves across the flat top 31 of the impregnator stand 14, serves to support the fiberglass reinforcing mat M which is impregnated with the acrylic syrup resin on this impregnator stand 14 and before it passes beneath the squeeze roll 16. The squeeze roll 16 is journalled on upward extensions 32, 32 of the impregnator stand 14 as it is provided with drive means 33.

By referring again to FIGURE 1 of the drawings, it will be observed that the impregnator stand 14 is symbolically provided with a resin supply tank 34 which in turn is connected with a resin mix tank or unit 35, and, as will be understood by those skilled in the art, means is provided therewith so that the resin supply, which in the present instance is an acrylic syrup, may be delivered by means of a communication line 36 to suitable nozzles or other discharge devices located on the impregnator stand 14 and above the fiberglass reinforcing mat M and adjacent the roll 16 as seen in FIGURE 2 of the drawings.

Still referring to FIGURE 1 of the drawings, it will be observed that the forming press is shown with a symbolic supply means for the foamable resin composition and this is indicated by the reference numeral 37. Means establishing communication with the supply means and extending into the area defined by the cavity in the panel to be formed is generally indicated by the numeral 38, and it will occur to those skilled in the art that this may well comprise a plurality of horizontally disposed hollow probes arranged for lateral movement and so positioned as to engage the area forming the cavity defined by the two spaced surface resin impregnated fiberglass mats as hereinbefore described.

By referring to FIGURE 5 of the drawings, a detailed view of the forming press 10 may be seen, and it will be observed that it is provided with supporting legs 39, 39 and that the top head 11 is provided with apertured brackets 40, 40 to which hook and cables 41 may be attached so that the top head may be lifted as shown. The top head 11 and the bottom stand of the forming press 10 are both heated and are provided with air pressure and/or vacuum connections so that suitable pressures may be exerted on the insulated core resin surface building panel being cured therein. Additionally, the bottom stand 10 of the forming press and the top head 11 thereof are provided with porcelain-enameled molds 42 and 43, respectively, which are preferably flat but which may be decorated to provide desirable surface configuration on the panels formed thereagainst.

Figure 6:
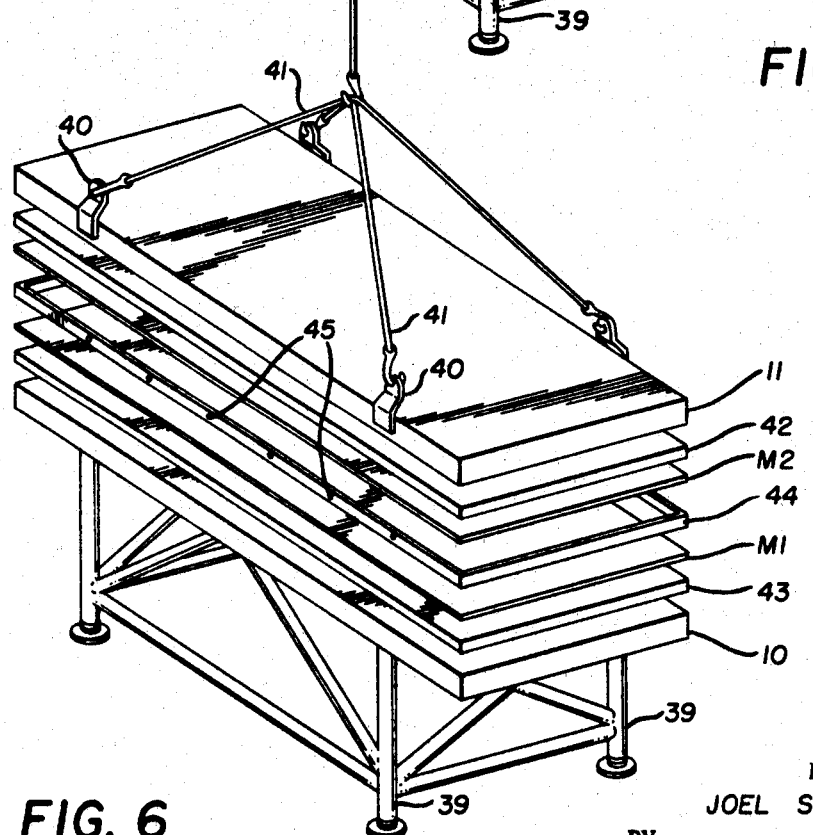
FIGURE 6 is a view of the forming press seen in FIGURE 5 showing in expanded exaggerated detail the components of the insulated core building panel positioned therein, together with the molds thereof.

By referring now to FIGURE 6 of the drawings, an exploded exaggerated detail of the components of the insulated resin core surface building panel may be seen in the curing position of the forming press 10. These comprise the lower slightly set resin impregnated fiberglass mat, the upper inverted resin impregnated fiberglass mat M2, the aluminum frame 44 positioned therebetween, the sides of which are preferably apertured as at 45, 45 to permit the insertion of the foamable resin composition as heretofore described.

It will be understood by those skilled in the art that the cellophane film sections upon which the impregnator fiberglass mats were originally placed and saturated are positioned in direct contact with the top and bottom porcelain-enameled molds 42 and 43 respectively and that these cellophane sheets are stripped from the finished panels after the same are cured in the forming press 10. The cellophane film sections support the liquid resin and the fiberglass mats during the forming steps.

It will thus be seen that the process of the invention disclosed herein has been sequentially described with reference to FIGURES 1, 2, 5 and 6 inclusive and that the solid resin surface panels may, by the present process or method, be unusually thin and of desirable characteristics, either fiberglass reinforced or not as desired, and that they are assembled into the forming press with the marginal spacers which comprise the aluminum frame 44, and the foamable resin composition introduced therebetween. These cellophane film supported resin sections which are but slightly set in the first stage of the method are thus cured simultaneously with the expanded foamable resin composition so that there is a positive unity in the completed building panel from its smooth solid resin surfaces through its foamed insulated core inasmuch as all of its integral parts are cured at one time in the forming press.

It will be observed that this integral and novel formation of an extremely desirable insulated core resin surface building panel is made possible by the positioning in the forming press of the cellophane film supported resin material reinforced with the fiberglass mat or not as the case may be, and the immediate introduction of the foamable resin composition therebetween and the immediate and subsequent curing of the thermal setting material. The general production sequence thus described is highly amenable to continuous operation as will be appreciated by those skilled in the art. Coordination of the sequencing may be automatic and continuous production may be achieved by the formation of the panels on a production line such as symbolically illustrated herein and hereinbefore described. Such continuous production will of necessity be controlled by the chemical and physical characteristics of the resin formulation selected for foaming of the resin core, and it will be seen that the heretofore believed necessary step of first forming the skin or surface panels and subsequently introducing the foamed resin core is eliminated in the present method at a considerable time and handling savings.

By referring to FIGURES 3 and 4 of the drawings, a finished panel may be seen and it will be observed that in FIGURE 4 which is an enlarged detail the resin surfaces are indicated by the letters R and the foamed resin core by the letter C. It will be seen that the surface panels are solid; that they are unusually thin, and that the majority of the area of the insulated core resin surface building panel comprises the foamed cured resin core C.

Those skilled in the art will observe that the temperature and pressure necessary for suitable formation will be determined by the particular resins employed. It has, for example, been determined that when the surfacing resins are formed of acrylic syrup and the foamable resin composition comprising the core is formed of polyurethane, approximately 10 lbs. p.s.i. maximum pressure is needed to insure proper shaping and size retention during the curing stage, and that the curing temperature in the forming press should be between 220° and 240° F. At this pressure and temperature, approximately 6 minutes is necessary for proper foaming and curing of the integral insulated core resin surface building panel.

It will thus be seen that a process of producing an integral insulated core resin surface building panel by a novel time and money saving method has been disclosed which utilizes heat pressure and vacuum to form the resin surfaces or skin from fluid stage simultaneously with foamable core and thereby insures a highly homogeneous product.

It will occur to those skilled in the art that in the event a solid core panel is desired, as, for example, for purposes of sound deadening, increased weight and lower cost, a solid core which could be made of indigenous materials may be introduced in the same process hereinbefore described in place of the foamed core and the surface resins and the solid core material cured simultaneously to form the solid core panel having all of the advantages of integral construction hereinbefore described.

It will thus be seen that a method of making desirable structurally strong, weather-resistant, building panels having insulated or noninsulated cores as desired has been disclosed and which method meets the several objects of the invention and having thus described my invention, what I claim is:

1. In a process for continuous step-wise production of insulated core resin surface building panels, wherein liquid resin is applied to a first flat supporting film, moving said film to a heating table where it is partially set, applying liquid resin to a second flat supporting film, moving said second film to a heating table where it is partially set, introducing said first and second films into a forming press in spaced oppositely disposed relation with said supporting films on the outer surfaces thereof, applying marginal retaining means thereto, introducing a foamable resin composition between said first and second films, allowing said foamable resin to form into contact therewith, and subjecting said films and foamable resin composition therebetween to curing temperatures and pressures to produce a foam cored panel, the improvement of using a cellophane sheet as both the supporting films and as a mold liner in the forming press.

References Cited

UNITED STATES PATENTS

| | | | |
|---|---|---|---|
| 2,639,252 | 5/1953 | Simon et al. | 264—45 |
| 2,642,920 | 6/1953 | Simon et al. | 264—45 X |
| 2,855,021 | 10/1958 | Hoppe | 264—45 X |

(Other references on following page)

UNITED STATES PATENTS

| | | | |
|---|---|---|---|
| 3,042,967 | 7/1962 | Edberg | 264—53 |
| 3,057,007 | 10/1962 | Vanden Berg | 264—45 X |
| 3,090,078 | 5/1963 | Ackles | 264—45 |
| 3,161,911 | 12/1964 | Mathews | 264—45 X |
| 2,613,397 | 10/1952 | Borkland | 264—338 XR |
| 2,772,194 | 11/1956 | Fisher et al. | 156—245 XR |
| 2,850,890 | 9/1958 | Rubenstein | 156—245 |
| 2,951,001 | 8/1960 | Rubenstein | 156—245 |
| 3,257,484 | 6/1966 | Barnette | 264—47 XR |

FOREIGN PATENTS

| | | |
|---|---|---|
| 627,525 | 1/1963 | Belgium. |
| 764,330 | 12/1956 | Great Britain. |
| 898,242 | 6/1962 | Great Britain. |
| 1,364,954 | 5/1964 | France. |

JAMES A. SEIDLECK, *Primary Examiner.*

A. H. BRODMERKEL, *Examiner.*

P. E. ANDERSON, *Assistant Examiner.*